(12) United States Patent
Bent et al.

(10) Patent No.: US 9,811,545 B1
(45) Date of Patent: Nov. 7, 2017

(54) STORAGE OF SPARSE FILES USING PARALLEL LOG-STRUCTURED FILE SYSTEM

(71) Applicant: EMC IP Holding Company LLC, Hopkinton, MA (US)

(72) Inventors: John M. Bent, Los Alamos, NM (US); Sorin Faibish, Newton, MA (US); Gary Grider, Los Alamos, NM (US); Aaron Torres, Los Alamos, NM (US)

(73) Assignees: EMC IP Holding Company LLC, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 809 days.

(21) Appl. No.: 13/921,719

(22) Filed: Jun. 19, 2013

(51) Int. Cl.
    G06F 17/00    (2006.01)
    G06F 17/30    (2006.01)

(52) U.S. Cl.
    CPC .. G06F 17/30321 (2013.01); *G06F 17/30286* (2013.01); *G06F 17/30312* (2013.01)

(58) Field of Classification Search
    CPC ......... G06F 17/30445; G06F 17/30321; G06F 17/30336; G06F 17/30575; G06F 17/30286; G06F 17/30312
    USPC ....... 707/746, 737, 736, 755, 764, 770, 809, 707/810
    See application file for complete search history.

(56) References Cited

U.S. PATENT DOCUMENTS 9,298,733 B1 * 3/2016 Faibish ................. G06F 17/302

2013/0159364 A1 * 6/2013 Grider ............... G06F 17/30224 707/826

OTHER PUBLICATIONS

Bent et al.; "PLFS: A Checkpoint Filesystem for Parallel Applications", 2009 Association for Computing Machinery; SC09 Nov. 14-20; 12 pages.*
Agarwalla et al.; "HPSS/DFS: Integration of a Distributed File System with a Mass Storage System", Sixth Goddard Conference on Mass Storage Systems and Technologies; Mar. 1998; pp. 57-69.*
Wikipedia on "Sparse file", dated Jun. 27, 2011, 6 pages.*
Bent et al., "Storage Challenges at Los Alamos National Lab", Parallel Data Laboratory, Carnegie Mellon University, 2012, 5 pages.*
Cranor et al. , "HPC Computation on Hadoop Storage with PLFS", Parallel Data Laboratory, Carnegie Mellon University, 13 pages, Nov. 2012.*

(Continued)

*Primary Examiner* — Monica Pyo
(74) *Attorney, Agent, or Firm* — Ryan, Mason & Lewis, LLP

(57) ABSTRACT

A sparse file is stored without holes by storing a data portion of the sparse file using a parallel log-structured file system; and generating an index entry for the data portion, the index entry comprising a logical offset, physical offset and length of the data portion. The holes can be restored to the sparse file upon a reading of the sparse file. The data portion can be stored at a logical end of the sparse file. Additional storage efficiency can optionally be achieved by (i) detecting a write pattern for a plurality of the data portions and generating a single patterned index entry for the plurality of the patterned data portions; and/or (ii) storing the patterned index entries for a plurality of the sparse files in a single directory, wherein each entry in the single directory comprises an identifier of a corresponding sparse file.

19 Claims, 7 Drawing Sheets

(56) References Cited

OTHER PUBLICATIONS

Mehta et al., "A Plugin for HDF5 using PLFS for Improved I/O Performance and Semantic Analysis", 2012 SC Companion: High Performance Computing, 7 pages.*
Jonathan Corbet, "SEEK_HOLE or FILEMAP?", 5 pages, https://lwn.net/Articles/260795, Dec. 3, 2007.*
Wikipedia, "Sparse file", 4 pages, https://en.wikipedia.org/w/index.php?title=Sparse_file&oldid=436539936; Jun. 27, 2011.*
Carns et al., "Understanding and Improving Computational Science Storage Access Through Continuous Characterization," ACM Transactions on Storate (TOS), vol. 7, No. 3, p. 8, 2011.
Pasquale et al., "A Static Analysis of i/o Characteristics of Scientific Applications in a Production Workload," Proceedings of the 1993 ACM/IEEE conference on Supercomputing. ACM, 1993, pp. 388-397.
Smirni et al., "Lessons from Characterizing the input/output Behavior of Parallel Scientific Applications," Performance Evaluation, vol. 33, No. 1, pp. 27-44, 1998.
Byna et al., "Parallel I/O Prefetching Using MPI File Caching and I/O Signatures," in Proceedings of the 2008 ACM/IEEE Conference on Supercomputing. IEEE Press, 2008, p. 44.
He et al., "Pattern-aware File Reorganization in mpi-io," in Proceedings of the Sixth Workshop on Parallel Data Storage. ACM, 2011. pp. 43-48.
Madhyastha et al., "Learning to Classify Parallel Input/Output Access Patterns," Parallel and Distributed Systems, IEEE Transactions on, vol. 13, No. 8, pp. 802-813, 2002.
Oly et al., "Markov Model Prediction of i/o Requests for Scientific Applications," in Proceedings of the 16th international conference on Supercomputing. ACM, 2002, pp. 147-155.
Tran et al., "Automatic Time Series Modeling for Adaptive i/o Prefetching," Parallel and Distributed Systems, IEEE Transactions on, vol. 15, No. 4, pp. 362-377, 2004.
He et al., "Discovering Structure in Unstructured I/O," University of Santa Cruz Conference, Nov. 2012.

* cited by examiner

| START LOGICAL OFFSET | START PHYSICAL OFFSET | LENGTH | STRIDE | NUMBER |
|---|---|---|---|---|
| 1 | 0 | 3 | 4096 | 5 |

```
plfs_make_write_index(logical_file=f, offset=o, length=l) {

// buffer the last index entry that was processed
    plfs_idx_ntry new_ntry = new plfs_idx_ntry(f,o,l)
    if (is_pattern(new_entry,last_ntry) {
        last_ntry.merge(new_entry);
    } else {
        index_flush(last_ntry);
        last_ntry = new_entry;
    }
}
```

```
plfs_find_physical_data(logical_file=f, offset=o, length=l) {

// read the pattern file and find relevant pattern
    pattern_entries = read_pattern_file(f);
    foreach pattern_entry in pattern_entries {
        // simple way is to expand pattern into default entries // but optimization (not shown) is also possible
        foreach index_entry in pattern_entry {
            if o in range(index_entry.offset,index_entry.length){ return index_entry;
            }
        }
    }
}
```

FIG. 7

700 — PARENT DIRECTORY

720 — DIRECTORY FOR FILE 1

| START LOGICAL OFFSET | START PHYSICAL OFFSET | LENGTH | STRIDE | NUMBER |
|---|---|---|---|---|
| 1 | 0 | 3 | 4096 | 5 |

730 — DIRECTORY FOR FILE 2

| START LOGICAL OFFSET | START PHYSICAL OFFSET | LENGTH | STRIDE | NUMBER |
|---|---|---|---|---|
| 27 | 0 | 50 | 8457 | 27 |

FIG. 8

800 — PARENT DIRECTORY

820

| START LOGICAL OFFSET | START PHYSICAL OFFSET | LENGTH | STRIDE | NUMBER | FILE ID |
|---|---|---|---|---|---|
| 1 | 0 | 3 | 4096 | 5 | 1 |
| 27 | 15 | 50 | 8457 | 27 | 2 |

840

| FILE ID | NAME |
|---|---|
| 1 | FILE 1 |
| 2 | FILE 2 |

*FIG. 9*

```
plfs_find_physical_data(logical_file=f, offset=o, length=l) {

// read the file id file, create map of fid->file
    fid_entries = read_file_id_file(f);

// read the pattern file and find relevant pattern
    pattern_entries = read_pattern_file(f);
    foreach pattern_entry in pattern_entries {
        if fid_entries{pattern_entry.fid} != f {
            next; // skip this entry, wrong file
        }
        // simple way is to expand pattern into default entries //
        for each index_entry in pattern_entry {
            if o in range(index_entry.offset,index_entry.length){ return index_entry;
            }
        }
    }
}
```

STORAGE OF SPARSE FILES USING PARALLEL LOG-STRUCTURED FILE SYSTEM

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to the storage of sparse files.

BACKGROUND

A sparse file is one that has small regions that have been written and the remainder of the file is not written. Holes in a sparse file are thus regions of the file that have not been written but have an offset value that is lower than the largest valid offset in the file. Most file systems do not actually save the "holes" on storage but rather save a more compact amount of metadata describing how the file is sparse.

Most modern file systems support sparse files by attempting to use file system space more efficiently when blocks allocated to the sparse file are mostly empty. For example, some file systems write brief information (metadata) representing the empty blocks to the disk instead of the actual "empty" space that makes up the block, thereby using less disk space. Typically, however, existing file systems will process sparse file at the granularity of a file system block, which is typically a value of 4096 bytes. When reading sparse files, the file system transparently converts metadata representing empty blocks into "real" blocks filled with zero bytes at runtime.

A need therefore exists for improved techniques for storing sparse files in a file system.

SUMMARY

Embodiments of the present invention provide improved techniques for storing sparse files using a parallel log-structured file system. In one embodiment, a sparse file is stored by storing a data portion of the sparse file in a file system using a parallel log-structured file system; and generating an index entry for the data portion, the index entry comprising a logical offset, physical offset and length of the data portion. In this manner, the data portion of the sparse file is physically stored without storing a hole associated with the data portion. The hole can be restored to the sparse file upon a reading of the sparse file. In one exemplary embodiment, the data portion is stored at a logical end of the sparse file. According to a further aspect of the invention, additional storage efficiency is achieved by detecting a write pattern for a plurality of the data portions and generating a single patterned index entry for the plurality of the patterned data portions. According to another aspect of the invention, even more storage efficiency is achieved by storing the patterned index entries for a plurality of the sparse files in a single directory, wherein each entry in the single directory comprises an identifier of a corresponding sparse file.

Advantageously, illustrative embodiments of the invention provide sparse file storage using a log-structured file system. Sparse file storage in accordance with aspects of the present invention reduces data processing and transfer bandwidth costs, and preserves valuable disk space. These and other features and advantages of the present invention will become more readily apparent from the accompanying drawings and the following detailed description.

BRIEF DESCRIPTION OF THE DRAWINGS

FIG. 5 illustrates an exemplary index entry for the exemplary sparse file of FIGS. 1 and 2 in a patterned index implementation of the present invention;

FIGS. 6A and 6B illustrate exemplary pseudo code for writing and reading the sparse file of FIGS. 1 and 2, respectively, in a patterned implementation of the present invention;

FIG. 7 illustrates exemplary index entries for the two exemplary sparse files of FIGS. 1 and 2 in a patterned index implementation of the present invention;

FIG. 8 illustrates an exemplary index entry for a small file patterned index implementation of the present invention; and FIG. 9 illustrates exemplary pseudo code for reading the sparse files of FIG. 8 in a small file patterned implementation of the present invention.

DETAILED DESCRIPTION

The present invention provides improved techniques for storing sparse files using a parallel log-structured file system. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

According to one aspect of the invention, sparse files are stored using a parallel log-structured file system to reduce the overhead involved in the creation and storage of sparse files. Generally, the sparse file is processed by the parallel log-structured file system to store the small data regions that have been written in a single file without the holes that comprise the remainder of the sparse file. The aggregated small regions of data are then sequentially stored in a much smaller amount of physical storage space.

In one exemplary embodiment, the file system that stores the sparse files is implemented using the Parallel Log-Structured File System (PLFS), as modified herein to provide the features and functions of the present invention. See, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

Sparse File Storage

Figure 1:
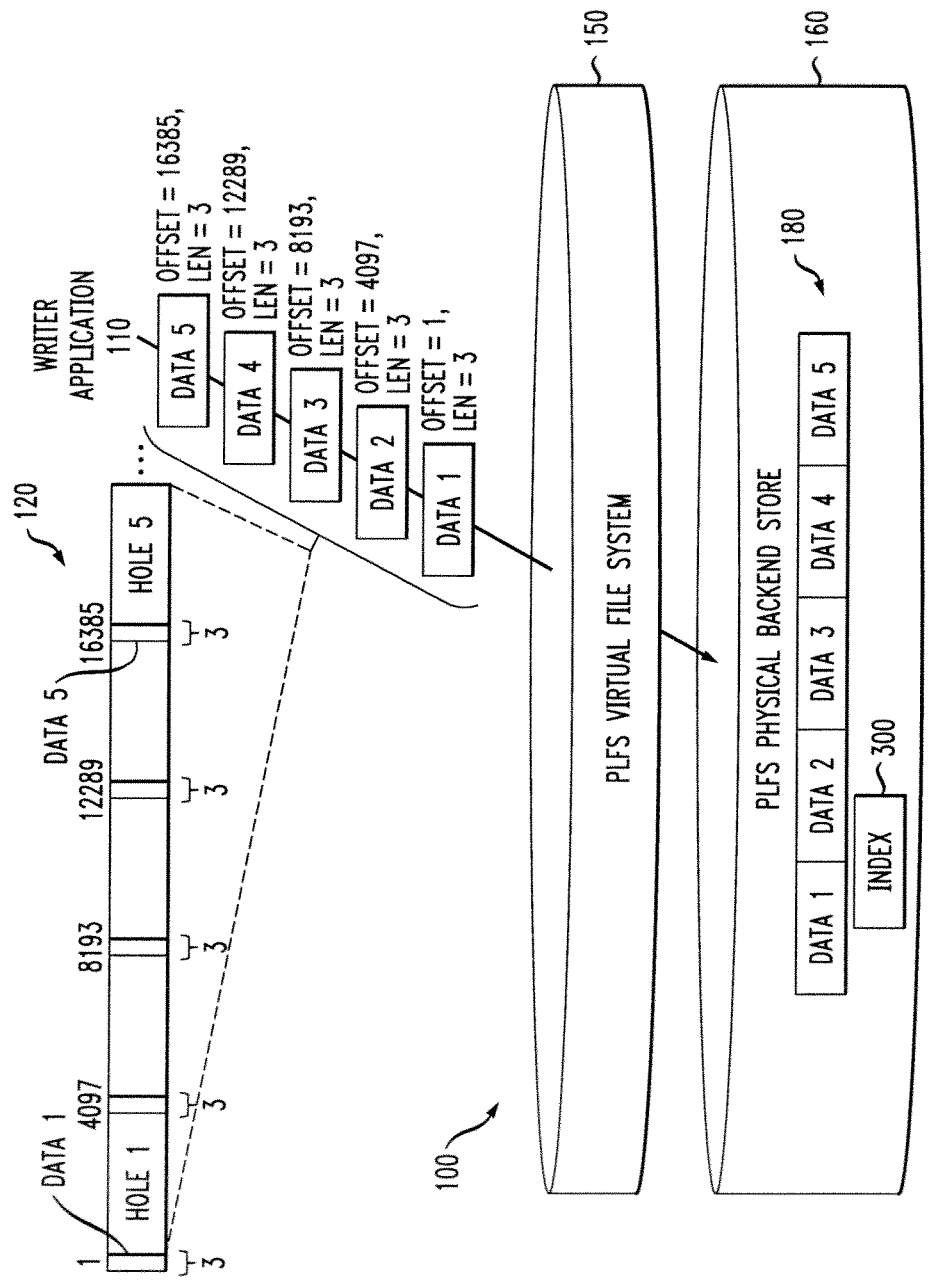
FIG. 1 illustrates an exemplary writer application that generates a sparse file that is stored in a file system in accordance with aspects of the invention.

FIG. 1 illustrates an exemplary writer application 110 that generates a sparse file 120 comprised of small regions of data (e.g., data1 through data5) and a number of holes (e.g., hole1 through hole5) between the small regions of data. An exemplary file system 100 comprised of a virtual file system 150 and a physical backend store 160. The writer application 110 provides the sparse file 120 to the virtual file system 150, such as PLFS. The virtual file system 150 then stores the sparse file 120 in an actual file system 160, such as a PLFS physical backend store, in a single file 180 comprised of the data (e.g., data1 through data5) without the holes (e.g., hole1 through hole5) that comprise the remainder of the sparse file 120. The virtual file system 150 may comprise, for example, a burst buffer (e.g., flash memory) to process the sparse files.

As discussed further below in conjunction with FIG. 4A, the virtual file system 150 employs a write operation 400 to write the data from the writer application 110 to the sparse file. The exemplary write operation 400 will store only the non-contiguous data (e.g., data1 through data5) in the file 180 in the order that the data was received, without the holes (e.g., hole1 through hole5). In addition, as discussed further below in conjunction with FIG. 3, the write operation 400 stores metadata in a separate index file 300 to record where the valid data is physically stored. The metadata also implicitly identifies where the holes belong in the sparse file 120.

The sparse file 120 is a logical view of a sparse file. The shaded regions are the places where the file actually has data. Each data region (e.g., data1 through data5) in the exemplary sparse file 120 has a length of 3 bytes, at 4096 byte offsets. If this pattern continues for one million blocks where only 3 bytes of actual data is written within every 4096 byte block, a file will result with a maximum offset of about 4 GB (gigabytes) with only three million valid bytes in it.

A conventional file system with no sparse file representation will use 4 GB for this file. A conventional file system will store only the blocks that have data but it will allocate 4K bytes for each block. Total storage used will be 4 GB. Note that conventional file systems are more efficient for sparse files in which entire blocks have no valid bytes but suffer for every partially filled block.

A sparse file storage system in accordance with the present invention will create a single file 180 that contains only the valid data bytes and an index file 300 having an index entry for each data range. In one exemplary implementation, each index entry is about 50 bytes so the size of the index file 300 will be 1,000,000*50 bytes for an exemplary file. The total size of the data file 180 will be 10 MB and the size of the index file 300 will be 2.5 MB. Total storage used will be 12.5 MB.

Figure 2:
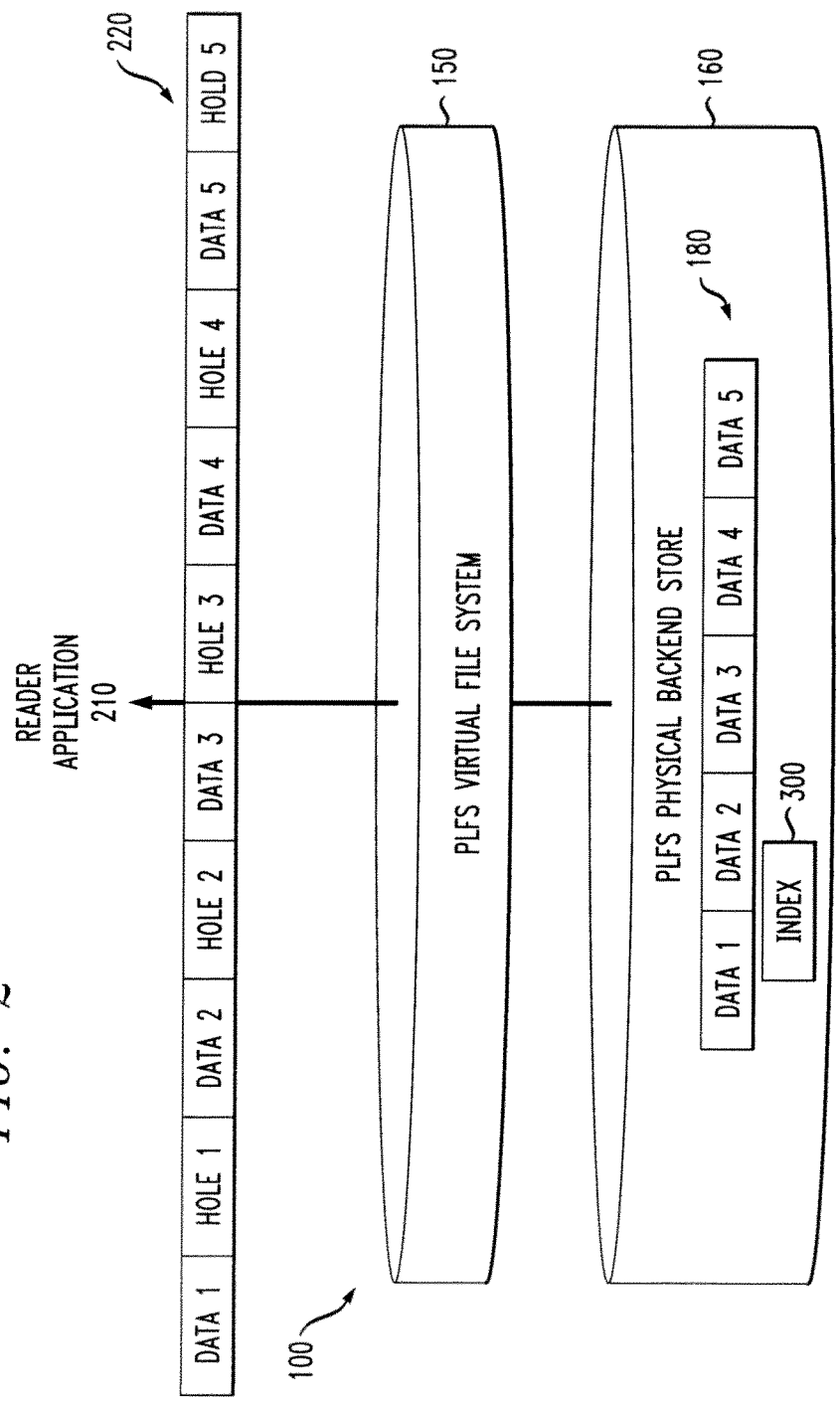
FIG. 2 illustrates an exemplary reader application that reads a sparse file that is stored in a file system in accordance with aspects of the invention.

FIG. 2 illustrates an exemplary reader application 210 that reads a sparse file 180 that is stored in a file system in accordance with aspects of the invention. When the exemplary reader application 210 requests to read the sparse filed 180, the virtual file system 150 employs a read operation 450, as discussed further below in conjunction with FIG. 4B, to process the index 300 in the physical backend store 160 to construct a view 220 of the sparse file 180 with the data (e.g., data1 through data5) in the appropriate locations and the corresponding holes (e.g., hole1 through hole5) restored. The sparse file view 220 is then delivered to the requesting reader application 210. The missing data is returned as a "hole" which is efficient, as no bytes for holes are stored on the storage device 160 nor are they transmitted over the network.

Default Sparse Files

Figure 3:
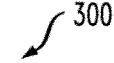
FIG. 3 illustrates an exemplary index entry for the exemplary sparse file of FIGS. 1 and 2.

FIG. 3 illustrates an exemplary index 300 for the exemplary sparse file 120 of FIGS. 1 and 2. As shown in FIG. 3, an entry in the exemplary index 300 for a given data record (e.g., data1) comprises a logical offset, a physical offset and a length of the data record. There will be an index 300 (e.g., a physical subdirectory) for every logical file 120/180. In addition, within the index 300 for each logical file 120, there will be an index entry for every data byte range (e.g., data1 through data5).

Figure 4A:
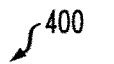
FIGS. 4A and 4B illustrate exemplary pseudo code for writing and reading the sparse file of FIGS. 1 and 2, respectively.
Figure 4B:

FIGS. 4A and 4B illustrate exemplary pseudo code for writing and reading the sparse file of FIGS. 1 and 2, respectively. FIG. 4A illustrates exemplary pseudo code for a write operation 400 for storing a sparse file 120 in accordance with aspects of the present invention. The write pseudo code 400 buffers the last index entry that was processed and creates a new index entry in the index 300 for the current data record being stored. The arguments of the write pseudo code 400 identify the logical sparse file 120, the offset for the current data record and the length of the current data record. The generated index entry is appended to the particular index 300 corresponding to the sparse file 120.

FIG. 4B illustrates exemplary pseudo code 450 for a read operation that is performed to provide a requested sparse file of FIG. 2 to the requesting reader application 210. As indicated above, when the exemplary reader application 210 requests to read the sparse file 180, the virtual file system 150 employs the read operation 450 to process the index 300 in the physical backend store 160 to construct a view 220 of the sparse file 180 with the data (e.g., data1 through data5) in the appropriate locations by sorting the logical offset values and the corresponding holes (e.g., hole1 through hole5) are restored. The sparse file view 220 is then delivered to the requesting reader application 210.

The exemplary pseudo code 450 reads the index 300 and returns the relevant data records (e.g., data1 through data5) with holes inserted in between (e.g., hole1 through hole5).

Patterned Index Sparse Files

FIG. 5 illustrates an exemplary index entry 500 for the exemplary sparse file 120 of FIGS. 1 and 2 in a patterned index implementation of the present invention. As discussed further below in conjunction with FIG. 6, a patterned index implementation of the present invention compresses entries in the index 300 of FIG. 3 when patterns are detected in the write pattern.

As shown in FIG. 5, an entry in the exemplary index 500 for a given pattern of data records (e.g., data1) comprises a start logical offset, a start physical offset, a length of each data record, a stride (i.e., how often the pattern repeats) and a number of data records in the pattern. The number entry is incremented for every additional stored data record that continues the pattern. There will be an index 500 (e.g., a physical subdirectory) for every logical file 120. In addition, within the index 500 for each logical file 120, there will be an index entry for the pattern of data byte ranges (e.g., data1 through data5).

FIGS. 6A and 6B illustrate exemplary pseudo code for writing and reading the sparse file 120 of FIGS. 1 and 2, respectively, in the patterned implementation of the present invention. FIG. 6A illustrates exemplary pseudo code for a write operation 600 for storing a sparse file 120 in accordance with the patterned implementation. The write pseudo code 600 buffers the last index entry that was processed and updates a pattern entry in the index 500 for the current data record being stored. The arguments of the write pseudo code 600 identify the logical sparse file 120, the offset for the current data record and the length of the current data record. The entries in the particular pattern index 500 corresponding to the sparse file 120 are updated to increment the number count for the latest data record.

The pattern detection can be performed in accordance with the techniques described, for example, in "Jun He et al., Discovering Structure in Unstructed I/O," in Proc. of the 2012 SC Companion: High Performance Computing, Networking Storage and Analysis. 1-6 (2012), incorporated by reference herein.

FIG. 6B illustrates exemplary pseudo code 650 for a read operation that is performed to provide a requested sparse file 120 of FIG. 1 to the requesting application in the patterned implementation of the present invention. As indicated above, when the exemplary reader application 210 requests to read the sparse file 180, the virtual file system 150 employs the read operation 650 to process the index 500 in the physical backend store 160 to construct a view 220 of the sparse file 180 with the data (e.g., data1 through data5) in the appropriate locations and the corresponding holes (e.g., hole1 through hole5) restored. The sparse file view 220 is then delivered to the requesting reader application 210.

Small File Patterned Index Sparse Files

FIG. 7 illustrates exemplary index entries 720, 730 in a parent directory 700 for two different exemplary sparse files 120 of FIGS. 1 and 2 in a patterned index implementation of the present invention. As shown in FIG. 7, an entry in the exemplary index 720 for a given pattern of data records (e.g., data1) in a first file (file1) comprises a start logical offset, a start physical offset, a length of each data record, a stride (i.e., how often the pattern repeats) and a number of data records in the pattern, as discussed above in conjunction with FIG. 5. The second entry 730 corresponds to a second file (file2) having a different write pattern. As indicated above, there is an index 720, 730 (e.g., a physical subdirectory) for every logical file 120. In addition, within the index 720, 730 for each logical file 120, there will be an index entry for the pattern of data byte ranges (e.g., data1 through data5 for file1).

In a small file patterned index sparse file implementation of the present invention, the indexes 720, 730 for each logical file can be stored, without sub-directories. In one exemplary implementation, two physicals files are employed and no sub-directories are needed, regardless of the total number of logical files that are stored.

For a more detailed discussion of small file aggregation techniques, see, for example, U.S. patent application Ser. No. 13/536,315, filed Jun. 28, 2012, entitled, "Small File Aggregation in a Parallel Computing System," (now U.S. Pat. No. 8,825,652), incorporated by reference herein.

FIG. 8 illustrates an exemplary parent directory index 800 comprised of two files 820, 840 in a small file patterned index implementation of the present invention for the two exemplary logical files discussed above in conjunction with FIG. 7. The exemplary first file 820 compresses the patterned indexes 500 for a plurality of files into a single directory.

As shown in FIG. 8, an entry in the exemplary file 820 comprises a start logical offset, a start physical offset, a length of each data record, a stride and a number of data records in the pattern, in a similar manner to FIG. 5, as well as a file identifier (file id) field that identifies the corresponding logical file. The number field in a given entry is incremented for every additional stored data record that continues the pattern in the corresponding logical file 120. There will be an entry in the file 820 for every logical file 120, identified by file id. In addition, a second file 840 maps the file identified to the corresponding file name.

FIG. 9 illustrates exemplary pseudo code 900 for reading the sparse files of FIG. 8 in a small file patterned implementation of the present invention. The read operation in a small file patterned implementation will process the index entries in the parent directory index file 820 to determine if it includes the target logical offset requested by the reading application 210.

Among other benefits, the disclosed sparse file storage techniques provide an efficient sparse file representation at the granularity of a byte as opposed to a block which is typically 4096 bytes. In the extreme case in which only a single byte is valid within a logical 4K block, the disclosed sparse file storage technique uses only a single byte instead of 4096 bytes. While many existing file systems use a minimum of 4,096 bytes to store the data for each file, the disclosed sparse file storage approach can use significantly less.

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

One or more of the devices in this implementation include a processor or another hardware device coupled to a memory and a network interface. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, the methods in accordance with the present invention, such as those described in conjunction with FIGS. 4 and 5, can be implemented at least in part in the form of one or more software programs that are stored in the device memory and executed by the corresponding processor. The memory is also used for storing information used to perform computations or other operations associated with the invention.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for storing a sparse file, comprising the steps of:

obtaining, using at least one processing device, at least a portion of said sparse file, wherein said sparse file portion comprises a plurality of data portions and a corresponding plurality of holes, wherein each of said plurality of data portions has been written with data and wherein remainder portions of said sparse file portion associated with each of said holes have not been written with data;

detecting a write pattern for a plurality of said data portions of a plurality of said sparse files;

generating, using at least one processing device, a patterned index entry for each of said sparse files only for said patterned data portions of said plurality of said sparse files, each of said patterned index entries comprising a logical offset, physical offset and length of each of said data portions; and storing, using at least one processing device, said plurality of data portions of said sparse file in a single file in a storage device of a file system using a parallel log-structured file system without storing said hole associated with each of said data portions, wherein said patterned index entries for said plurality of said sparse files are stored as a file in a directory, wherein each patterned index entry in said file comprises an identifier of a corresponding sparse file.

2. The method of claim 1, wherein said hole is restored to said sparse file upon a reading of said sparse file.

3. The method of claim 1, wherein said storing step further comprises the step of storing said data portion at a logical end of said sparse file.

4. The method of claim 1, wherein said sparse file is generated by a process running on a compute node in a parallel computing system.

5. The method of claim 1, wherein said sparse file is provided to a middleware virtual file system for storage.

6. The method of claim 1, wherein said sparse file is stored on a parallel file system comprised of one or more disks.

7. A computer program product comprising a tangible machine-readable recordable storage medium having encoded therein executable code of one or more software programs, wherein the one or more software programs when executed by the processor of the processing device implement the steps of the method of claim 1.

8. An apparatus for storing a sparse file, comprising:
a memory; and
at least one processing device operatively coupled to the memory and configured to:
obtain, using said at least one processing device, at least a portion of said sparse file, wherein said sparse file portion comprises a plurality of data portions and a corresponding plurality of holes, wherein each of said plurality of data portions has been written with data and wherein remainder portions of said sparse file portion associated with each of said holes have not been written with data;
detecting a write pattern for a plurality of said data portions of a plurality of said sparse files;
generate, using said at least one processing device, a patterned index entry for each of said sparse files only for said patterned data portions of said plurality of said sparse files, each of said patterned index entries comprising a logical offset, physical offset and length of each of said data portions; and
store, using said at least one processing device, said plurality of data portions of said sparse file in a single file in a storage device of a file system using a parallel log-structured file system without storing said hole associated with each of said data portions, wherein said patterned index entries for said plurality of said sparse files are stored as a file in a directory, wherein each patterned index entry in said file comprises an identifier of a corresponding sparse file.

9. The apparatus of claim 8, wherein said hole is restored to said sparse file upon a reading of said sparse file.

10. The apparatus of claim 8, wherein said at least one hardware device is further configured to store said data portion at a logical end of said sparse file.

11. The apparatus of claim 8, wherein said sparse file is generated by a process running on a compute node in a parallel computing system.

12. The apparatus of claim 8, wherein said sparse file is provided to a middleware virtual file system for storage.

13. The apparatus of claim 8, wherein said sparse file is stored on a parallel file system comprised of one or more disks.

14. A data storage system for storing a sparse file, comprising:
a hardware processing unit for obtaining at least a portion of said sparse file, wherein said sparse file portion comprises a plurality of data portions and a corresponding plurality of holes, wherein each of said plurality of data portions has been written with data and wherein remainder portions of said sparse file portion associated with each of said holes have not been written with data; detecting a write pattern for a plurality of said data portions of a plurality of said sparse files; generating, using at least one processing device, a patterned index entry for each of said sparse files only for said patterned data portions of said plurality of said sparse files, each of said patterned index entries comprising a logical offset, physical offset and length of each of said data portions; and storing, using said at least one processing device, said plurality of data portions of said sparse file in a single file of a file system using a parallel log-structured file system without storing said hole associated with each of said data portions, wherein said patterned index entries for said plurality of said sparse files are stored as a file in a directory, wherein each patterned index entry in said file comprises an identifier of a corresponding sparse file; and
a storage device for storing said sparse files and said patterned index entries.

15. The data storage system of claim 14, wherein said hole is restored to said sparse file upon a reading of said sparse file.

16. The data storage system of claim 14, wherein said storing step further comprises the step of storing said data portions at a logical end of said sparse files.

17. The data storage system of claim 14, wherein said sparse files are generated by a process running on a compute node in a parallel computing system.

18. The data storage system of claim 14, wherein said sparse files are provided to a middleware virtual file system for storage.

19. The data storage system of claim 14, wherein said sparse files are stored on a parallel file system comprised of one or more disks.

* * * * *